United States Patent [19]
Boult et al.

[11] Patent Number: 5,635,637
[45] Date of Patent: Jun. 3, 1997

[54] APPARATUS FOR MEASURING THE FLOW RATE OF A FLUID

[75] Inventors: Brian F. Boult; Geoffrey W. Dingley; Michael B. Heslin; Kevin Ryan; Peter S. Jackson, all of Auckland, New Zealand

[73] Assignee: Tru-Test Limited, Auckland, New Zealand

[21] Appl. No.: 392,808

[22] PCT Filed: Aug. 31, 1993

[86] PCT No.: PCT/NZ93/00077

§ 371 Date: Apr. 24, 1995

§ 102(e) Date: Apr. 24, 1995

[87] PCT Pub. No.: WO94/05980

PCT Pub. Date: Mar. 17, 1994

[30] Foreign Application Priority Data

Aug. 31, 1992 [NZ] New Zealand .................. 244152

[51] Int. Cl.[6] .................................................. G01F 1/76
[52] U.S. Cl. ........................ 73/223; 73/215; 119/14.17
[58] Field of Search ........................ 73/215, 223, 861.71; 119/14.14, 14.15, 14.16, 14.17

[56] References Cited

U.S. PATENT DOCUMENTS

| 4,452,176 | 6/1984 | Hoefelmayr et al. | 73/215 |
| 4,955,270 | 9/1990 | Volk | 73/861.71 |
| 5,035,139 | 7/1991 | Hoefelmayr et al. | 73/233 |

FOREIGN PATENT DOCUMENTS

| 0 228 100 | 7/1987 | European Pat. Off. . |
| 3 404 581 | 8/1985 | Germany . |
| 3 729 439 | 3/1989 | Germany . |

*Primary Examiner*—George M. Dombroske
*Assistant Examiner*—Harshad Patel
*Attorney, Agent, or Firm*—Jacobson, Price, Holman & Stern, PLLC

[57] ABSTRACT

A meter which measures fluid flow by passing the fluid through a receptacle and determining the mass of fluid in the receptacle. The shape of the receptacle, the fluid flow path within the receptacle and the receptacle outlet are chosen to ensure that for a selected fluid the mass of fluid in the receptacle is a linear function of fluid flow rate. The mass is determined by weighing the receptacle. Total mass flow is determined by integrating the mass measurement over time if particular application of the meter is as a milk meter.

20 Claims, 5 Drawing Sheets

APPARATUS FOR MEASURING THE FLOW RATE OF A FLUID

BACKGROUND OF THE INVENTION

This invention relates to the measurement of fluid flow rate and/or total mass flow. The invention relates particularly, though not solely to measuring the flow rate and/or total mass flow of milk supplied during milking of cows. In this application the invention provides an electronic milk meter.

By "flow rate" it is meant liquid rate in mass unit time e.g. kg/min. By "total mass flow" it is meant the integration of flow over the measurement time.

When measuring the flow of, in particular, liquids which are not uniform in composition, such as, for example, the milk, delivered during machine milking which foams due to substantial and varying amounts of entrained air and other gases, an accurate determination of the flow rate or the total mass flow of liquid is difficult to achieve. With milk, because of the differing quantities of air and other gases contained within the milk, the density of the milk may change substantially during the milking process. An acceptable accuracy for total mass flow is within 2% of the actual yield of milk supplied. It has been found that it is difficult if not impossible to remove the gas from milk to an extent that will enable this accuracy to be achieved whilst measuring the milk volume during milking or very soon after the milking occurs. As one of the main purposes of measuring the total mass flow is to determine the milk yield from each animal substantial removal of gas would require the milk to be retained in individual cow portions for a substantial period of time. Clearly, this is impractical. A method proposed to overcome the problem of density variation in measuring milk volume is described in U.S. Pat. No. 5,035,139 where the foam profile of milk passing through a chamber is measured by measuring specific densities of the milk at different heights in the chamber. It would, however, be advantageous to measure total mass flow in a more direct manner rather than by making numerous volume and density measurements.

SUMMARY OF THE INVENTION

It is therefore an object of the present invention to provide a means of measuring flow rate and/or total mass flow which will simplify the aforementioned measuring procedure or which will at least provide the industry with a useful choice.

Accordingly in one aspect, the invention consists in an apparatus for measuring flow rate of a fluid comprising, a chamber, an inlet to the chamber, an outlet from the chamber, means for determining the mass of fluid in the chamber wherein the shape of the chamber and/or the shape of at least part of the fluid flow path through the chamber is such that the flow rate of a selected fluid through the chamber is in a substantially linear relationship to the mass measured by the means.

In a further aspect, the invention consists in an apparatus for measuring total mass flow of a fluid comprising an apparatus for measuring flow rate according to the preceding paragraph and summation means to determine total mass flow by integrating a plurality of measurements of said flow rate with respect to time.

In a still further aspect, the invention consists in a method of measuring flow rate of a fluid comprising the steps of weighing a chamber through which fluid flows, the chamber being shaped and/or at least part of the fluid flow path through the chamber being shaped such that the flow rate of a selected fluid is in a substantially linear relationship to the weight of fluid within the chamber.

In a still further aspect, the invention consists in a method of measuring total mass flow of a fluid comprising measuring flow rate according to the method of the preceding paragraph and integrating a plurality of measurements of the flow rate with respect to time to determine a total mass flow of fluid passed through the chamber.

BRIEF DESCRIPTION OF THE DRAWINGS

Preferred forms of the invention will now be described with reference to the accompanying drawings in which.

DESCRIPTION OF THE PREFERRED EMBODIMENT

Figure 1:
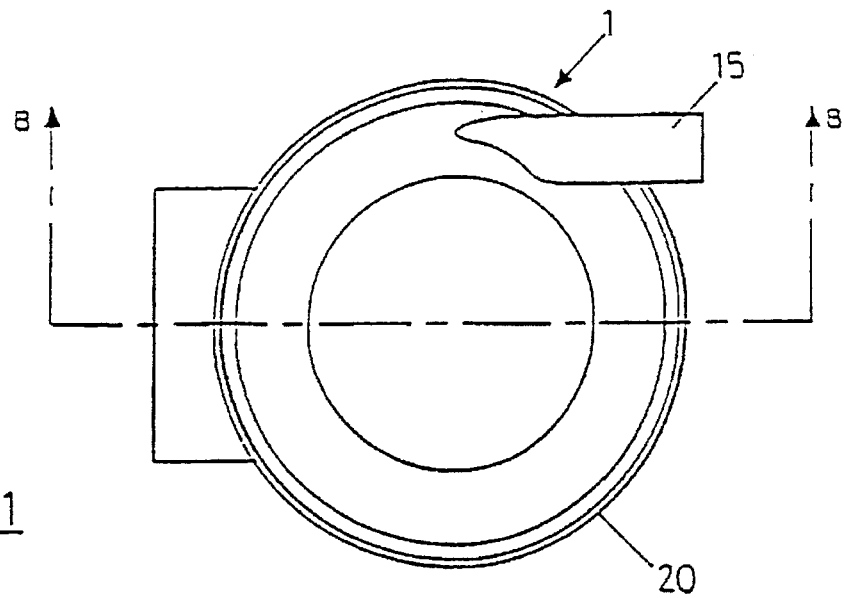
FIG. 1 is a plan view of the mechanical components of a first form of the apparatus for measuring flow rate and/or total mass flow of fluid.
Figure 2:
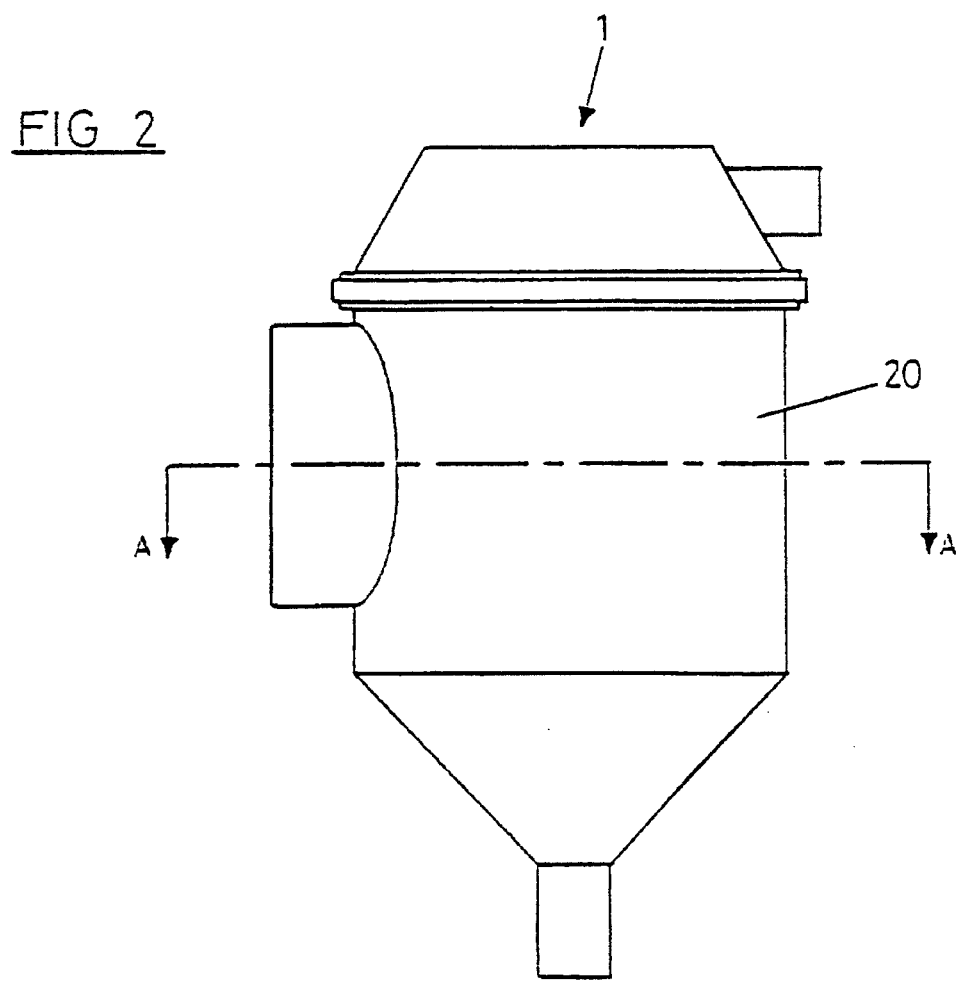
FIG. 2 is a side elevation of the construction of FIG. 1.
Figure 3:
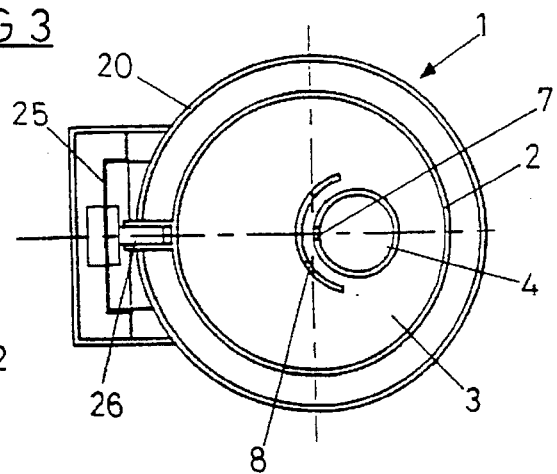
FIG. 3 is a cross section on AA in FIG. 2.
Figure 5:
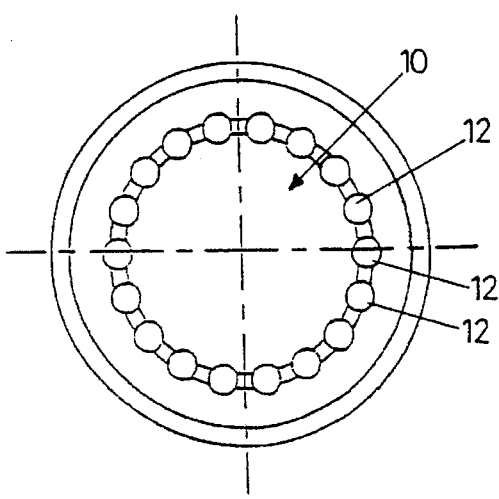
FIG. 5 is a plan view of a distribution plate for use in the apparatus according to any one of FIGS. 1 to 4.
Figure 4:
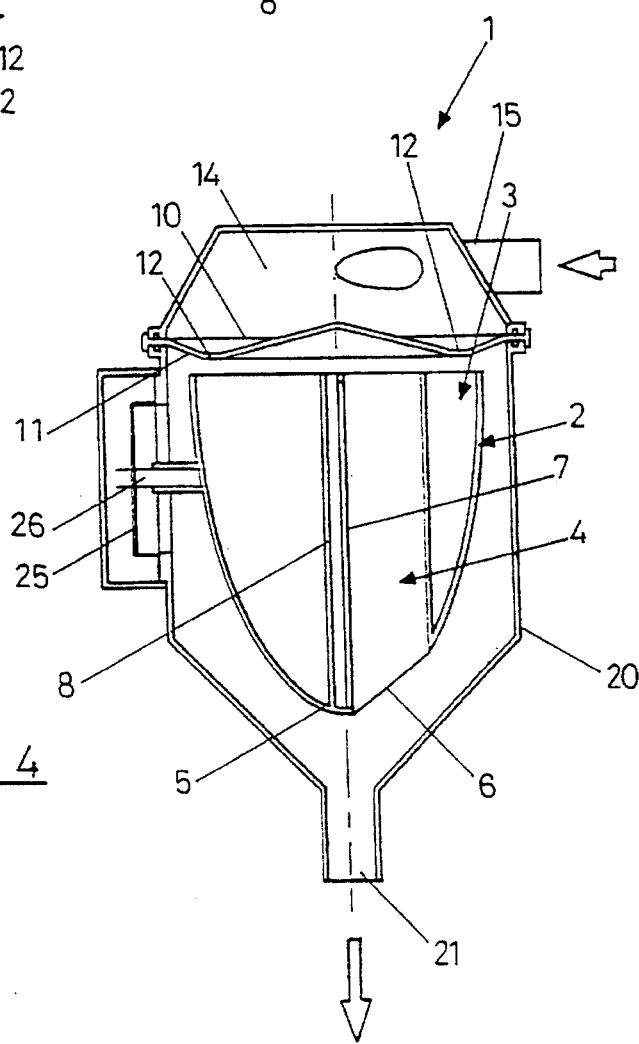
FIG. 4 is a cross section on BB in FIG. 1.

In the measuring apparatus shown in FIGS. 1 to 5, fluid is passed through a chamber 2 which is suspended within a container 20 by a force transducer mechanism 25 which generates a signal which is conditioned to provide a measure of fluid flow rate. The substantially cup shaped chamber 2 receives fluid through the open top of compartment 3 and fluid leaves the chamber through a conduit 4 extending upwardly from the base 5 of the chamber 2. The conduit 4 is open at its lower end 6 and has a longitudinal slot 7 in the wall thereof. In the preferred form the slot 7 is substantially parallel sided, although other shapes of slot, such as a slot widening towards the lower end could be used. Thus fluid being deposited through the entrance 3 will pass through the slot 7 to the outlet 6.

Where the fluid to be measured is milk (for simplicity the term "milk" will be used in this description and the apparatus referred to as a "milk meter") coagulated particles, or the like may be present, the width of the slot 7 must be sufficient to enable such particles to pass through without clogging. A slot 7 having a width of 2 mm has been found to be adequate but it is desirable to have a wider slot 7 such as 6 mm. Where a slot 7 of this width is to be used it is necessary to impede the passage of the milk through slot 7 and this can be achieved by the use of a baffle 8. Baffle 8 is preferably substantially arcuate in shape and in the embodiment shown in the drawings the arcuate baffle 8 extends a little less than half way around the circumference of the conduit 4. Baffle 8 could alternatively be positioned inside the conduit 4 rather than outside as shown in the drawings. An alterative baffle shape to that illustrated which would be suitable is a spiral.

The milk is desirably introduced into the compartment 3 through a distribution plate 10 which is shaped to guide the milk away from the upper end of the conduit 4. This is achieved by providing distribution plate 10 with an annular depression 11 and a plurality of apertures 12 therein (see FIG. 5) through which the milk may flow. An inlet chamber 14 located above the guide plate receives milk tangentially through an inlet port 15. This allows some cyclonic or rotational movement of the milk to occur which will assist in degassing the milk.

The cup shaped chamber 2 is suspended within an outer housing 20, the upper parts of which may form the inlet chamber 14. Outer housing has an outlet 21 through which milk exiting conduit 4 through outlet at 6 will ultimately pass.

The outer housing 20 carries a force transducer such as diaphragm load cell 25 to which chamber 2 is connected by a suitable connecting member 26. As this is the only means of support for chamber 2 and as the apparatus is used with the longitudinal axis of chamber 2 arranged vertically the weight of milk in the chamber 2 will cause distortion of the diaphragm which causes the load cell strain gauges to vary in resistance which variation is used to vary the load cell output voltage.

Figure 6:
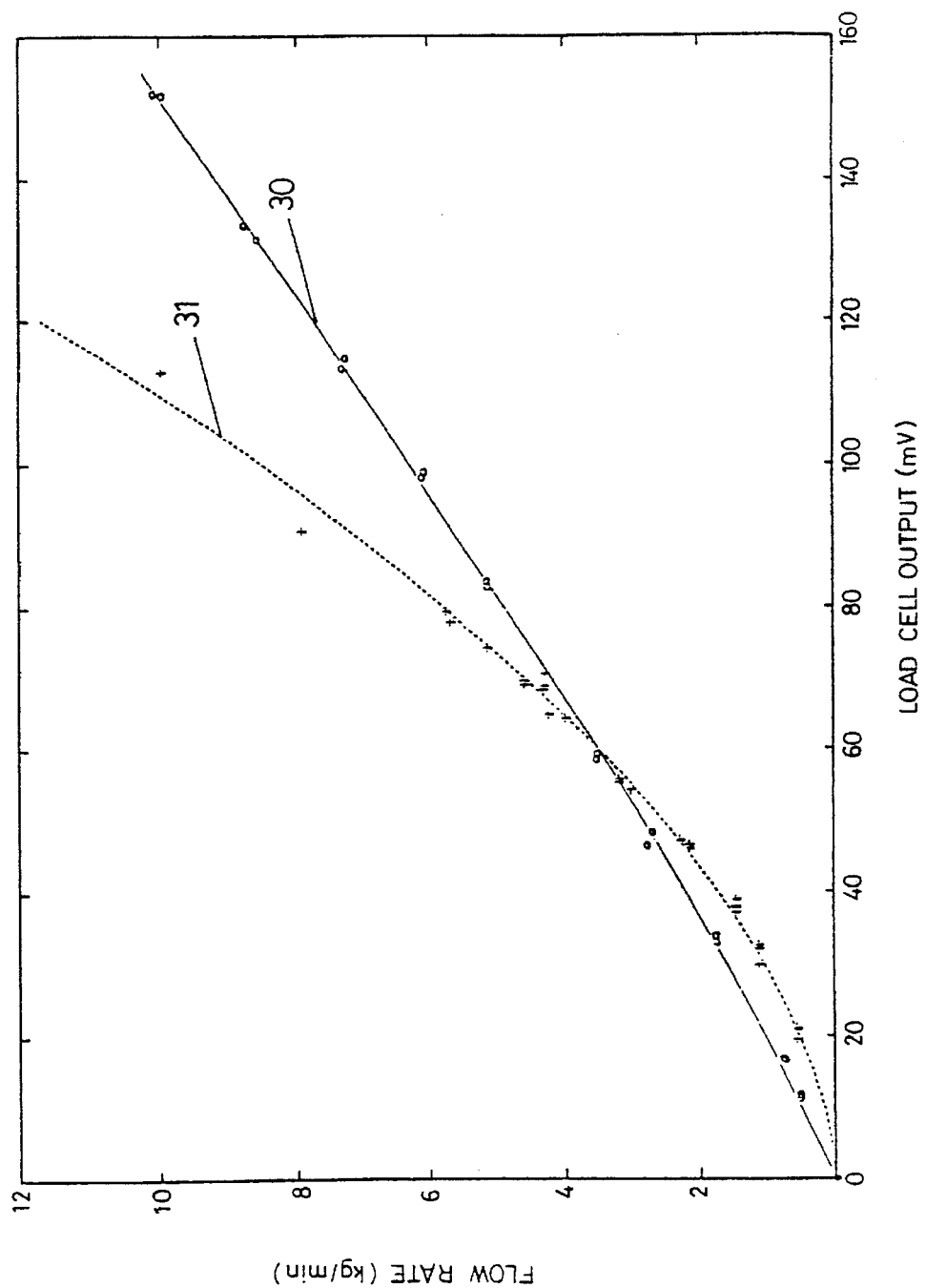
FIG. 6 shows flow rates of a selected fluid through the apparatus shown in FIGS. 1 to 5 plotted against the weight of fluid in the apparatus as registered by a load cell.

Thus the instantaneous weight of milk in the chamber 2 gives rise to an output signal which can be measured. Desirably, the milk flow rate in kilograms per minute is substantially linear with respect to the load cell output. FIG. 6 is a graph of load cell output voltage against flow rate of milk for an apparatus of the type described. Curve 30 is for the chamber configuration described herein where substantial linearity has been achieved. Curve 31 is for a chamber having two pairs of parallel sides with a rectangular slot in one side. It can be seen that such a simple arrangement is non-linear.

Linearity can be achieved by suitably selecting the shape of chamber 2. In the embodiment shown in FIGS. 1 to 5 it can be seen that the container is somewhat egg shaped and in fact a container shape determined by the relatiosip $$V(h)=V_{max}(h/h_{max})^R$$

where

V(h) is the volume of the container for a fluid height h, $h_{max}$ is the maximum height of fluid, $V_{max}$ is the volume of fluid at the height $h_{max}$, and n is the exponent is suitable when $h_{max}$=90 mm, $V_{max}$=314 cubic cm and n=1.74. Other factors will also have some effect. For example, the positioning and size of the baffle 8, the size and shape of the conduit 4 and the width of the exit as a function of height. If a non parallel sided slot 7 is used a different relationship between volume and height would be required.

The output of the load cell is indicative of weight, the linear relationship between flow rate and weight which can be obtained (curve 30) means that the milk meter output is substantially independent of the milk density. As already mentioned milk has a tendency to foam in transfer and the density of aerated milk is much lower than non-aerated milk. Substantially eliminating density as a factor in the measurement of total mass flow is therefore high advantageous.

In use milk from a cow is introduced into the upper chamber 14 through the inlet 15. The milk then falls through apertures 12 in the distribution plate 10 into the chamber 2 to pass between the wall of the conduit 4 and the baffle 8. It then flows through the slot 7 and outwardly down through the conduit 4, into outer housing 20 and then leaves the meter through outlet 21. At any given time, a quantity of milk will be present in chamber 2. The flow rate will inevitably cause the quantity of milk within the chamber 2 to vary. The load cell will therefore produce a signal having a varying amplitude. The total mass flow is derived by integrating this signal with respect to time and thus is not dependent on having a constant flow rate.

Figure 7:
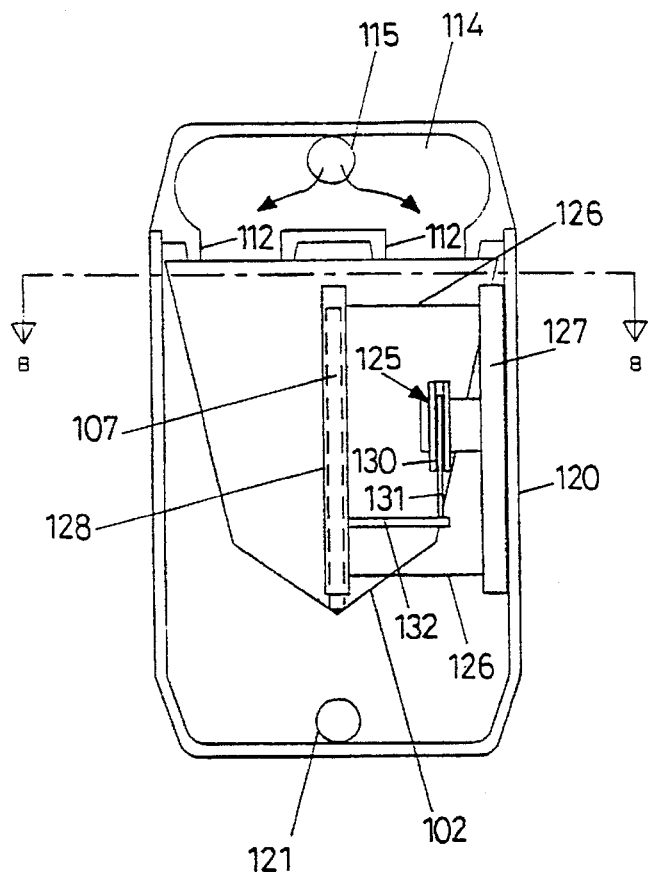
FIGS. 7 to 9 show three sectional views of a second form of the apparatus for measuring flow rate and/or total mass flow of a fluid.
Figure 8:
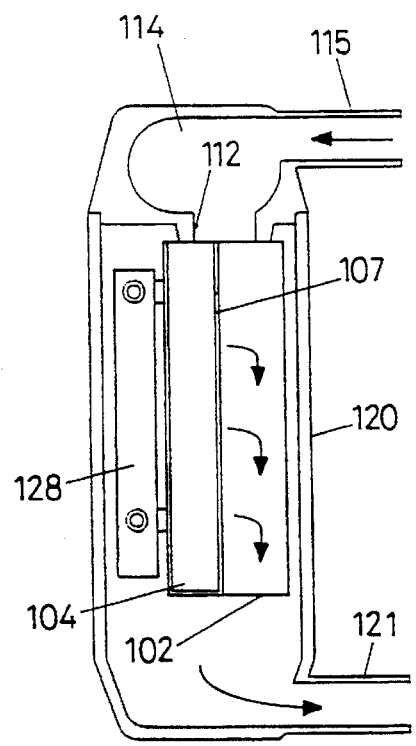
Figure 9:
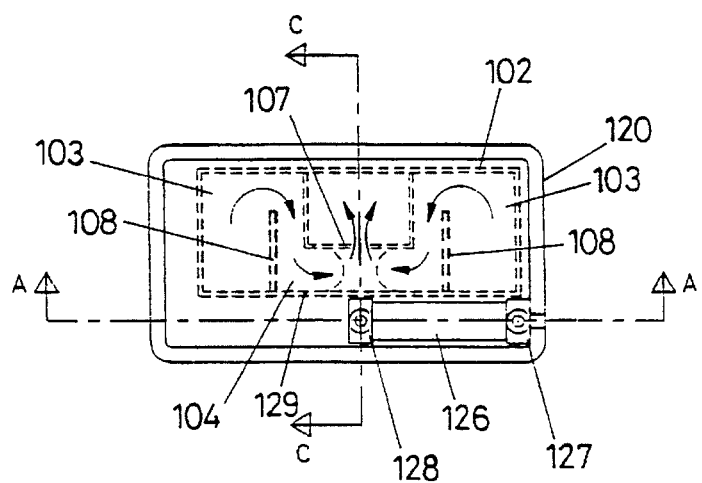

A second form of milk meter is shown in FIGS. 7 to 9. This uses a chamber having two parallel sides which is thus able to be accommodated within a "flat pack" outer housing 120. In this form of meter, the chamber 102 is suspended within outer housing 120 by leaf springs 126. In this form of meter, a different transducer is used to provide the output signal, namely a linear variable - differential transformer (LVDT) 125.

Milk enters the meter through inlet 115 and passes into a distribution manifold 114 where it spreads transversely to pass down through the two discharge ports 112. The milk then passes into opposite sides of chamber 102. The flow path followed by the milk is indicated by the arrows marked in each of FIGS. 7, 8 and 9.

On entering chamber 102 from discharge ports 112 the milk flows into sub chambers 103. It passes from these sub chambers around baffles 108 into a further sub chamber 104 which is in communication with both sub chambers 103. The milk then exits from sub chamber 104 through an aperture or slot 107 from whence it flows to the bottom of outer container 120 and leaves the meter through outlet 121. The configuration of slot 107 is determined by the same factors as have already been described in relation to the first form of meter. The external shape of chamber 102 together with the flow path determined by ports 112, baffles 108 and sub chamber 104 minimizes froth inducement in the milk as it passes through the meter and thus reduces errors in metered output arising from this phenomenon. Furthermore, as for the first form of meter the second form of meter has a configuration such as to ensure that the weight of milk within chamber 102 at any given time is linearly proportional to the flow rate at that time and curve 30 in figure is substantially representative of the performance of the second form of milk meter.

Chamber 102 is suspended within outer housing 120 by two leaf springs 126 cantilevered from mounting member 127 which in turn is fastened to the outer housing 120. A link member 128 connects between the outer ends of springs 126 and is fastened to the back wall 129 of chamber 2. Milk present in chamber 2 causes leaf springs 126 to deflect downward by a distance proportional to the weight of milk in chamber 2. This displacement is measured by an LVDT transducer 125. This comprises mutually coupled transformer windings 130 surrounding a movable ferromagnetic core 131. The core is free to move longitudinally within windings 130 and is mechanically coupled by arm 132 to link members 128. Thus as the leaf springs displace and chamber 102 moves downwards, so does core 131 thereby reducing the mutual inductance between the LVDT windings 130 and thus varying the output voltage of the LVDT.

The output of the LVDT is a linear function of the displacement of core 131 and as the displacement of chamber 102 is substantially a linear function of the flow rate of fluid passing through it, the output of the LVDT is a linear function of that flow rate. The LVDT output signal may be integrated to provide a measure of total mass flow.

Figure 10:
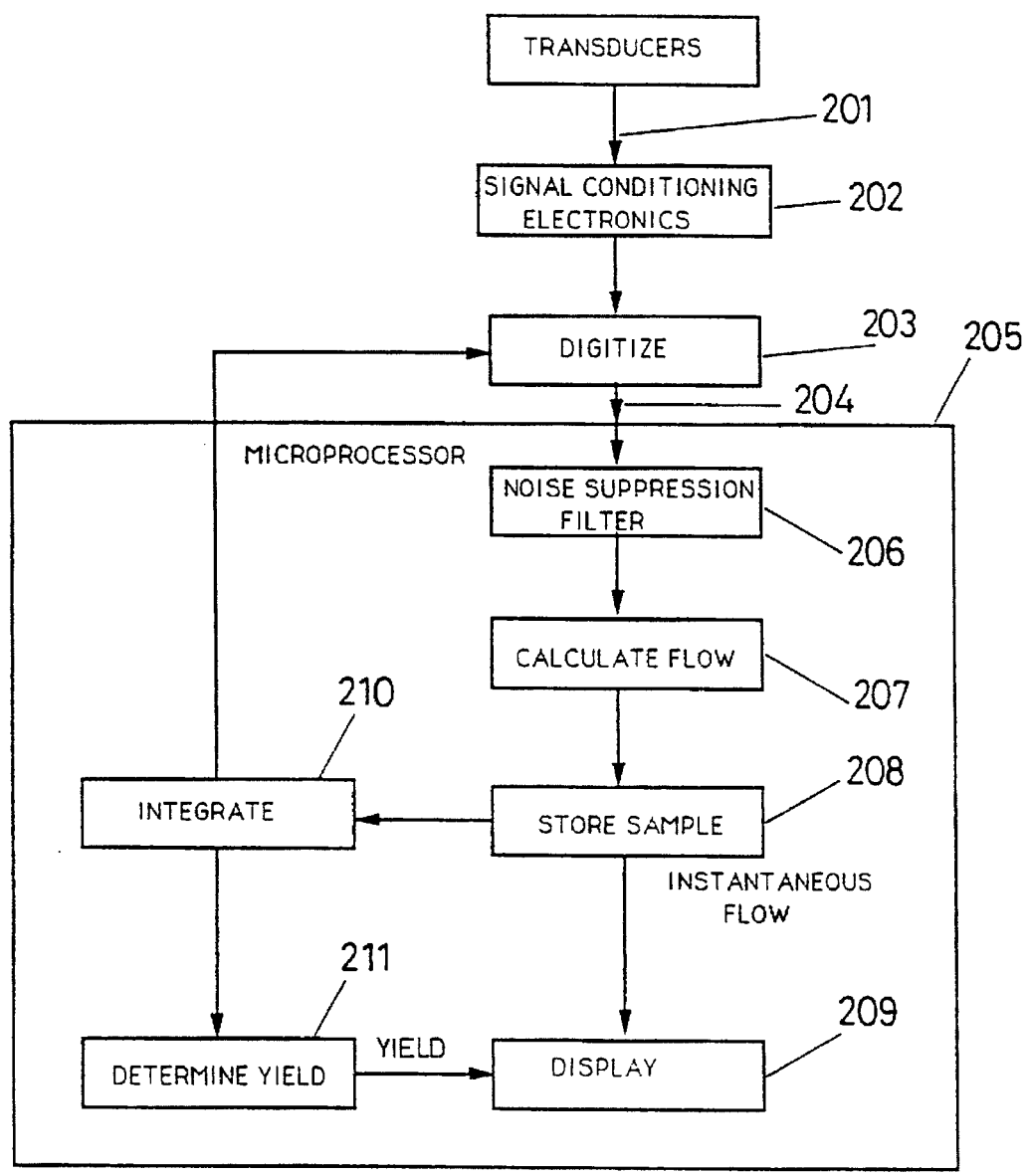
FIG. 10 is a block diagram of the signal processing circuits for the apparatus.

Meter signal processing for deriving and displaying flow rate and total mass flow measurements from the transducer output signal is shown in FIG. 10. The signal processing system illustrated could be used for either of the meter input stages described above.

The electrical signal 201 from the selected primary transducer is input to analog signal conditioning circuits 202 where the signal is amplified and noise filtered. As mentioned above secondary transducers may be used to assist in producing a clean and accurate signal and thus the conditioning circuits 202 may receive more than one input. The output of the signal conditioning circuits is fed to a digitizing circuit 203 which samples the instantaneous signal value and converts each sample to a digital input 204 for microprocessor 205. Digitizer 203 is under the control of microprocessor 205.

Microprocessor 205 carries out a number of functions determined by the microprocessor software. These include a noise suppression function 206 and a flow rate calculation function 207. Flow rate calculations are successively stored in memory 208 and are available to output to a digital display 209 which will thus display instantaneous flow rate in kilograms per minute, for example.

An integrate function 210 operates on successive instantaneous flow rate samples from memory 208 to determine total mass flow or "yield" over the measurement period. The output of the integration operation is stored in memory 211 for outputting to display 209 whenever required.

In the two forms of meter described, two different transducers have been used, namely a force transducer and a displacement transducer. Other transducer types could also be used. It will be appreciated that the meters described are subject to turbulent variable flow of a fluid having variable density. With such a dynamic system, the electrical output of the transducers requires signal conditioning to remove noise and the like. To assist in signal conditioning, sensors could be used to measure the presence of fluid within chamber 102 at different heights within that chamber. Known sensors such as infrared detectors or conductivity detectors could be used to provide further data to assist in signal discrimination.

Although the two forms of meter described have been described with reference to the measurement of flow rate and total mass flow of milk, it should be understood that the meter of the present invention is useful for measuring flow rate and total mass flow of other fluids, particularly some which are difficult to measure using conventional techniques. Other liquids having entrained gases may be metered as may substances having fluid-like flow characteristics. An examples of the latter is particulate material such as cereal grains. The description of the working fluid as "milk" and the term "milk meter" have been used with reference to the two embodiments described simply for the purposes of simplification and clarity.

Thus it can be seen that, the invention provides a means for measuring flow rate and/or total mass flow which has the advantage that the flow rate measured or total mass flow measured for a homogeneous fluid is substantially independent of the density of the fluid passing through the measuring cell. Thus changes in density do not affect the reading. It will also be apparent that a weight or mass measurement can be obtained without storing or collection of the fluid.

We claim:

1. Apparatus for measuring flow rate of a fluid comprising, a chamber, an inlet to said chamber, an outlet from said chamber, and means for determining the mass of fluid in the chamber, said chamber and/or at least part of the fluid flow path through the chamber having a shape such that the flow rate of a selected fluid through said chamber, entering through said inlet and exiting through said outlet is in a substantially linear relationship to the mass of fluid in said chamber and the fluid flow rate through said chamber is substantially a linear function of the mass determined by said means.

2. Apparatus according to claim 1 wherein said mass determining means is a weighing system upon which said chamber is supported.

3. Apparatus according to claim 2, wherein said chamber and said weighing system are contained within an outer housing, said weighing system being fixed to said outer housing.

4. Apparatus according to claim 2 wherein said weighing system is a load cell arranged to produce a voltage directly proportional to the weight exacted on the cell.

5. Apparatus according to claim 2 wherein said weighing system is spring means and a displacement transducer coupled to said chamber arranged to produce a voltage directly proportional to displacement.

6. Apparatus according to claim 1, wherein said outlet from said chamber includes an aperture, fluid which has passed through said aperture being outside the chamber, said aperture and said chamber being shaped such that the flow rate of said selected fluid through said aperture is in a substantially linear relationship to the mass of fluid in said chamber.

7. Apparatus according to claim 1, wherein said outlet from said chamber comprises a conduit extending upwardly from a base of said chamber and a longitudinal slot in a wall of said conduit through which fluid in the chamber may flow.

8. Apparatus according to claim 7, wherein said slot is substantially rectangular and said chamber is substantially egg-shaped.

9. Apparatus according to claim 7, wherein a baffle plate having dimensions greater than those of said slot is provided in said chamber in front of and spaced apart from said slot to thereby cause the fluid to flow around edges of the baffle before passing through said slot.

10. Apparatus according to claim 9, wherein said chamber is contained in an outer housing and wherein an inlet chamber having a fluid inlet thereto is incorporated in said outer housing above said chamber and adapted to discharge into said chamber.

11. Apparatus according to claim 10 wherein said inlet chamber is circular in horizontal cross section and said fluid inlet is positioned to cause rotational or cyclonic movement of said fluid within said inlet chamber.

12. Apparatus according to claim 10, wherein a distribution plate is provided between said inlet chamber and said chamber, said distribution plate oriented horizontally in use and having a plurality of apertures or slots therein through which said fluid passes into said chamber.

13. Apparatus according to claim 12, wherein said distribution plate has a substantially annular groove therein, said groove having a base and said apertures being provided in the base of said groove.

14. Apparatus according to claim 10, wherein a distribution plate is provided between said inlet chamber and said chamber, and said distribution plate has a single aperture through which fluid passes into said chamber.

15. Apparatus according to claim 1, wherein said chamber is rectangular in transverse cross section with an indentation in one long side, said outlet is a slot in said indentation, and said chamber has two sides which are parallel and the other two sides taper inwardly towards the bottom of the chamber.

16. Apparatus according to claim 15 wherein said chamber has two top opening inlets each disposed adjacent a tapered side.

17. Apparatus according to claim 16 wherein two baffles are located within said chamber oriented parallel to said slot and each are located in a fluid flow path from a respective inlet to said outlet slot.

18. Apparatus according to claim 1, further comprising a summation means to determine total mass flow by integrating a plurality of measurements of said flow rate with respect to time.

19. A method of measuring flow rate of a fluid comprising the steps of passing fluid through a chamber, said chamber and/or at least part of the fluid flow path through the chamber being shaped such that the flow rate of a selected fluid is in a substantially linear relationship to the mass of fluid within said chamber, and determining the mass of fluid in said chamber, the fluid flow rate being substantially a linear function of determined mass.

20. A method of measuring flow rate according to claim 19, further comprising the step of integrating a plurality of measurements of said flow rate with respect to time to determine a total mass flow of fluid passed through said chamber.

* * * * *